United States Patent [19]

Alcamo

[11] Patent Number: 4,836,047
[45] Date of Patent: Jun. 6, 1989

[54] BICYCLE PEDAL SYSTEM

[76] Inventor: John M. Alcamo, 2336 Bolton Ct., Modesto, Calif. 95356

[21] Appl. No.: 187,193

[22] Filed: Apr. 28, 1988

[51] Int. Cl.⁴ ............................................. G05G 1/14
[52] U.S. Cl. .................................. 74/594.6; 74/534.4; 36/131
[58] Field of Search ............................. 74/594.6, 594.4; 36/131, 132

[56] References Cited

U.S. PATENT DOCUMENTS

| | | |
|---|---|---|
| 3,788,163 | 1/1974 | Gause et al. |
| 3,964,343 | 6/1976 | Lauterbach |
| 4,188,737 | 2/1980 | Haver |
| 4,244,239 | 1/1981 | Campagnolo |
| 4,269,084 | 5/1981 | Okajima |
| 4,361,972 | 12/1982 | Miller |
| 4,377,952 | 3/1983 | Gamondes |
| 4,381,683 | 5/1983 | Takeda |
| 4,506,463 | 3/1985 | Chassaing |
| 4,538,480 | 9/1985 | Trindle |
| 4,596,163 | 6/1986 | Bon |
| 4,686,867 | 8/1987 | Bernard et al. |

FOREIGN PATENT DOCUMENTS

| | | | |
|---|---|---|---|
| 0106162 | 4/1984 | European Pat. Off. | 36/131 |
| 3722191 | 1/1988 | Fed. Rep. of Germany | 74/594.6 |
| 3722192 | 1/1988 | Fed. Rep. of Germany | 74/594.6 |
| 2279607 | 2/1976 | France | 74/594.6 |
| 84/03677 | 9/1984 | PCT Int'l Appl. | 74/594.6 |

Primary Examiner—Richard E. Moore
Assistant Examiner—Vinh Luong
Attorney, Agent, or Firm—Flehr, Hohbach, Test, Albritton & Herbert

[57] ABSTRACT

A bicycle pedal system comprising a shoe clip which attaches to a bicyclist's shoe and has a pair of serrated lateral tongues which couple with and are easily inserted into complementary serrated recesses in the associated bicycle pedal. The construction and configuration of the system, including the negative undercut serrations permits easy insertion of the clip into the pedal and permits relatively easy lateral sliding of the clip along the pedal and lateral removal of the clip from the pedal when not in use, but securely lock the clip in the pedal against relative lateral movement during use as well as against transverse separation.

4 Claims, 2 Drawing Sheets

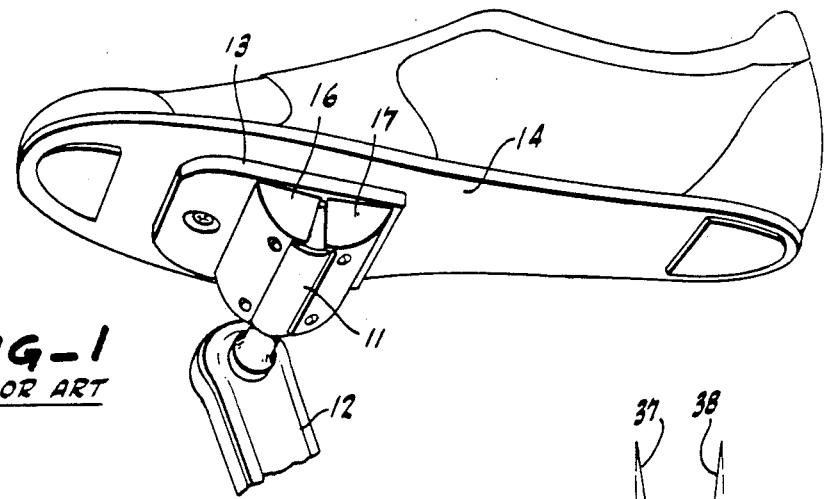
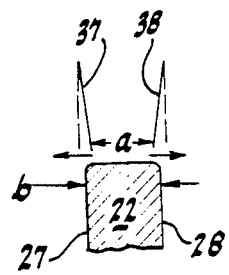
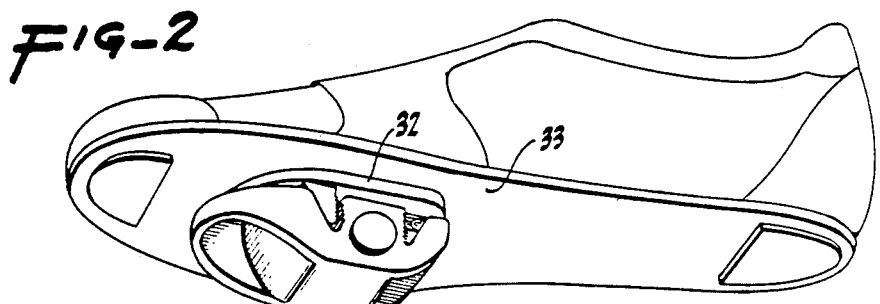
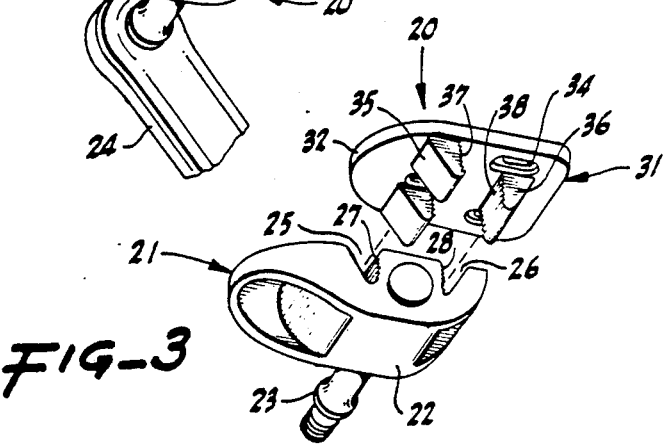

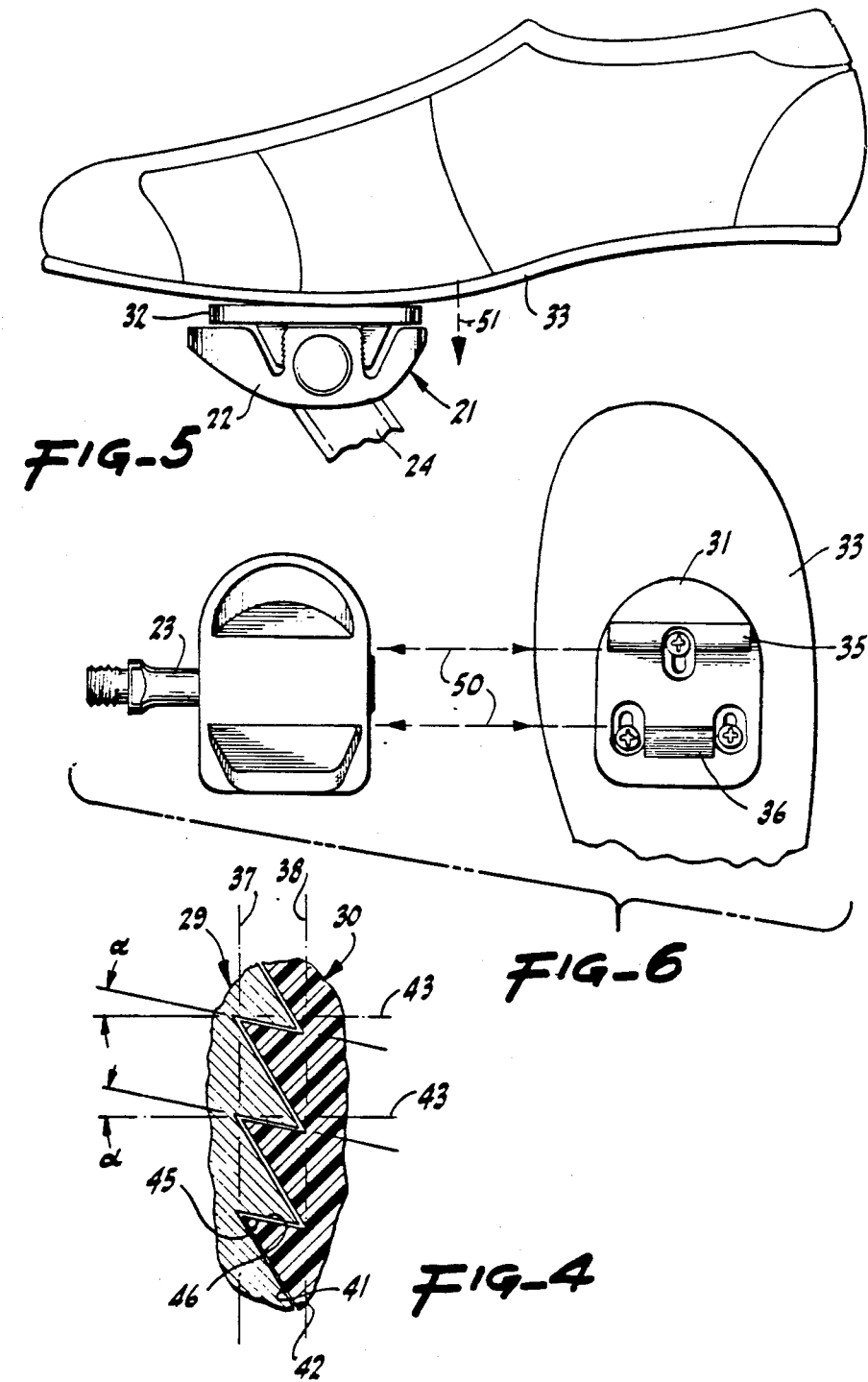

BICYCLE PEDAL SYSTEM

BACKGROUND OF THE INVENTION

The present invention relates to a bicycle pedal system and specifically to a mating shoe clip and bicycle pedal which are easily joined and are automatically locked together when in use, yet are separable when not in use.

DEFINITIONS

For reference purposes, I define as longitudinal or lateral any force or movement which is generally parallel to the rotational mounting axis of the bicycle pedal, and define as transverse any force or movement which is generally transverse to the pedal axis. Thus, lateral movement of the clip relative to the pedal or vice versa includes movement in the directions 50, FIG. 6, while transverse movement of the clip relative to the pedal or vice versa includes movement in the direction 51, FIG. 5.

PRIOR ART

A number of ostensibly locking bicycle toe/shoe clips are available in the market. However, to my knowledge, none of the available clips provides ease of mounting of the clip to the associated bicycle pedal in combination with secure locking against separation in both the lateral and transverse directions.

FIG. 1 depicts a prior art pedal system comprising a cylindrical pedal 11 mounted to a bicycle 12 and a clip which includes a sole plate 13 that mounts semicylindrical clips 16 and 17. This pedal system is typical of the prior art in that the clips readily mount onto the pedal, but can be separated from the pedal by transverse forces during use.

SUMMARY OF THE INVENTION

In view of the above discussion, it is one object of the present invention to provide a bicycle pedal system having components which mount together easily and automatically lock together in such a way as to prevent separation during use.

It is a related object of the present invention to provide a bicycle pedal system comprising a shoe or toe clip and a mating bicycle pedal which are easily mounted one to the other by lateral or transverse insertion, and can be separated by lateral sliding movement when not in use, yet are automatically locked together against transverse separation and, during use, are precluded from lateral separation by the forces generated by the bicyclist.

In one aspect, my bicycle pedal system which satisfies the above and other objectives includes a pedal and a shoe clip. The pedal is adapted for mounting along a rotational axis thereof to a bicycle and has a pair of laterally-extending grooves therein. The grooves are of V-shaped orientation and have lateral serrations of negative undercut orientation in at least one face thereof. The shoe clip is adapted for attachment to a shoe and has a pair of tongues of triangular orientation extending downwardly therefrom and laterally. The tongues also have lateral serrations of negative undercut orientation in at least one face thereof. The tongues and associated serrations are of size and configuration selected for closely fitting within the grooves and mating with the serrations on the grooves. Preferably, the shoe clip is formed of rigid but somewhat flexible material such as thermoplastic polymer, including but not limited to nylon or acetel material.

In a preferred configuration, the serrations are undercut such that each upper surface thereof extends downwardly at an angle of about 15° relative to a plane intersecting the planes of the associated groove or tongue faces at approximately equal angles.

BRIEF DESCRIPTION OF THE DRAWINGS

The above and other aspects of the invention are described with respect to the accompanying drawings in which:

FIG. 1 is a perspective view of a prior art toe clip;

FIG. 2 is a perspective view of a pedal system embodying my present invention, taken from below and showing the toe clip thereof mounted to a mating bicycle pedal;

FIG. 3 is a perspective view showing the toe clip and pedal of FIG. 2 in exploded relationship;

FIG. 4 depicts the mating sawtooth or serrated elements of the toe clip and pedal of FIG. 2, and defines geometrically the negative undercut configuration which contributes to locking of the toe clip and pedal;

FIG. 5 is a side elevation view of the pedal assembly of FIG. 2 in use;

FIG. 6 is a partial bottom plan view and front elevation view showing the toe clip and pedal in exploded relationship; and FIG. 7 schematically depicts the shoe clip spring action which enables secure locking of the clip to the pedal.

DESCRIPTION OF THE PREFERRED EMBODIMENT(S)

Referring to the perspective view of FIG. 2 and to the exploded perspective view of FIG. 3, my pedal and toe clip assembly 20 includes an elongated pedal assembly 21 and a mating removable toe clip 31. The pedal assembly 21 comprises an elongated pedal 22 and a cylindrical shaft 23 which is journaled within the pedal and mounted to the bicycle 24 so that the pedal and/or the shaft are free to rotate about the axis of the shaft. A pair of spaced laterally-extending grooves 25,26 of generally V-shaped cross-sectional configuration are formed in the pedal 22. The vertical, adjacent inner surfaces 27 and 28 are serrated. The individual serrations 29, FIG. 4, extend laterally along the width of the elongated pedal 22.

The toe clip 31 comprises an elongated base or sole plate 32 which preferably is contoured to mate precisely with shoe sole 33 and includes slotted holes 34 which permit the toe clip 31 to be attached to a shoe using screws, rivets, etc. The toe clip 31 is formed with or has mounted thereto a pair of spaced laterally-extending tongues 35 and 36 of generally triangular cross-section which are adapted in size, configuration and spacing to fit snugly within respective pedal grooves 25 and 26. The nearest adjacent facing inner tongue surfaces 37 and 38 extend substantially at right angles to the plane of the sole plate 32 and have serrations 30, FIG. 5, formed therein which are complementary to the serrations 29 in the pedal.

As shown most clearly in FIG. 4, the complementary mating teeth or serrations 29 and 30 are negative undercut. That is, the mating upper surfaces 45 and 46 of the serrations are oriented at a small angle, α, below the plane 43 which intersects the plane of the tongue sides 37 and 38 (and groove sides 27 and 28) at substantially equal angles. In the illustrated configuration, the surfaces 37 and 38 are substantially parallel and the planes 43 are substantially orthogonal to the surfaces and are approximately parallel to the plane of the toe clip plate 32.

Preferably, the toe clip 31 is formed of lightweight, relatively rigid, yet slightly flexible material such as thermoplastic polymer. Specific examples, not exhaustive, include nylon and acetel. Preferably, the pedal 22 is formed of lightweight, rigid material. Examples include aluminum, titanium, glass-filled nylon and other filled polymers, etc. The toe clip and pedal are very simple, easy to manufacture, and inexpensive. The form-holding rigidity and the slightly flexible characteristics of the toe clip material in combination with the rigidity of the pedal and the described complementary, serrated tongue and groove surfaces permit easy insertion of the toe clip 31 into the pedal 22 either laterally (from the side), as shown by arrows 50 in FIG. 6, or preferably transversely, by pressing the toe clip 31 into the pedal 22 from above, as shown by the arrow 51 in FIG. 5. As shown in FIG. 7, the tongues are formed with the faces 37 and 38 thereof angling slightly inwardly to a spacing, a, at the end which is slightly less than the spacing, b, between pedal groove faces 27 and 28. During insertion, the slightly resilient clip material allows the tongues to spread apart and compressively engage the pedal.

The slightly elastic form-holding material, the close fit between the tongues and grooves and the mating undercut sawtooth surfaces 29 and 30 lock the inserted toe clip 31 to the pedal 22 and prevent transverse separation once the toe clip is mounted to the pedal. The multiple serrations provide a corresponding multiple number of undercuts which together increase the yield point much in a manner of screw threads. Also, the compressive spring friction between the clip and pedal keeps the clip from slipping out of the pedal. The upward and downward forces exerted by the bicyclist's foot during use alternately compress the mating surfaces 41-42 and 45-46, FIG. 5, tightly together, creating sufficient friction to oppose unwanted lateral movement and separation of the toe clip from the pedal during use.

However, when the bicycle is not being operated and, thus, the toe clip and pedal are not subject to compressive forces, the clip can be moved laterally out of the pedal. The fit between the toe clip and pedal is tight so that the threshold force for removal is sufficiently high to prevent accidental separation. In short, my toe clip and pedal assembly provide a unique combination of low manufacturing cost and ease of insertion coupled with transverse interference locking and lateral frictional resistance to separation.

Having thus described preferred and alternative embodiments of my toe clip and pedal assembly, what is claimed is:

1. A bicycle pedal system comprising: a pedal formed of rigid material and being adapted for mounting along a rotational axis thereof to a bicycle and having a pair of lateral grooves therein, each groove being defined by two faces oriented in a V-shaped configuration and having lateral serrations of negative undercut configuration in at least one face thereof; and a shoe clip formed of rigid somewhat flexible material and being adapted for attachment to a shoe and having a pair of lateral tongues of generally triangular configuration extending downwardly therefrom, the tongues having lateral serrations of negative undercut configuration extending along at least one face thereof corresponding to said at least one groove face, and the tongues and the serrations thereof being of selected size and configuration for closely fitting within the associated grooves and to the serrations of said associated grooves.

2. The bicycle pedal system of claim 1, wherein the shoe clip is formed of thermoplastic polymer material.

3. The bicycle pedal system of claim 1, wherein the shoe clip is formed of thermoplastic polymer material and the pedal is formed of material selected from aluminum, titanium, polymer and filled polymer.

4. The bicycle pedal system of claim 1, wherein the serrations are undercut such that the upper surface thereof extends downwardly at an angle of about 15° relative to a plane intersecting the planes of said faces at approximately equal angles.

* * * * *